April 29, 1969 A. J. WHITE 3,441,197
SIDE OPENING CONTAINER
Filed April 10, 1967
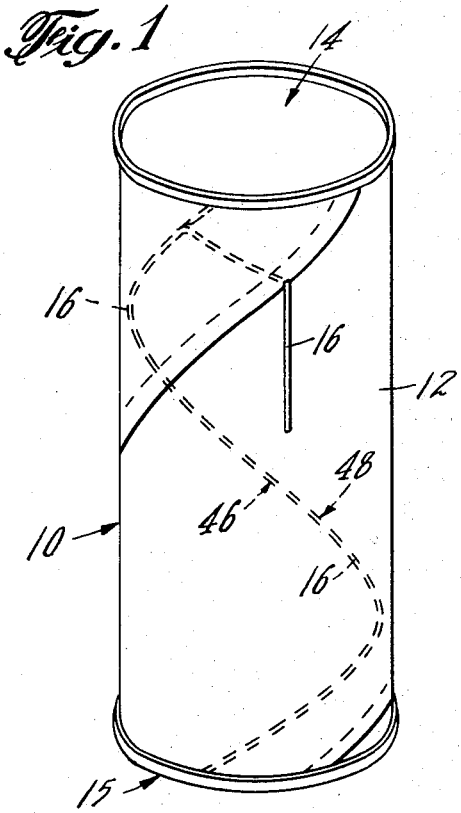
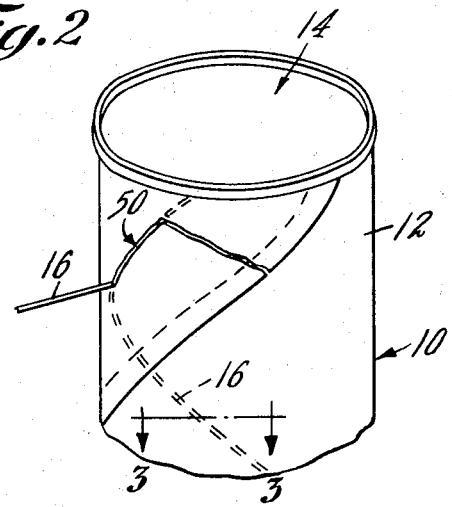
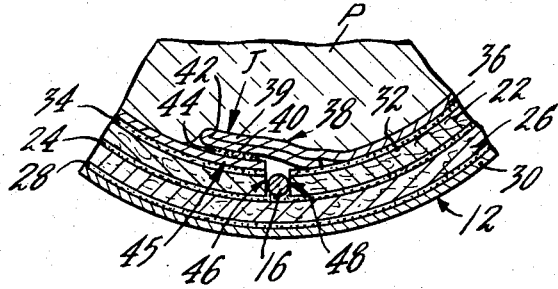
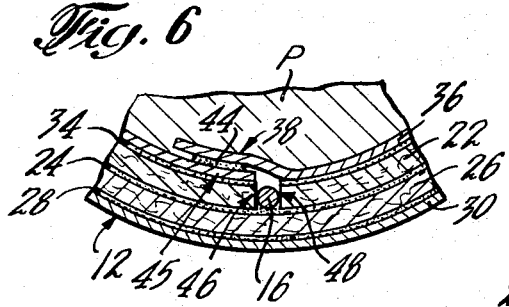
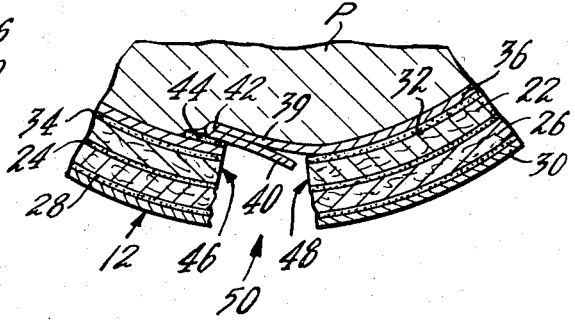
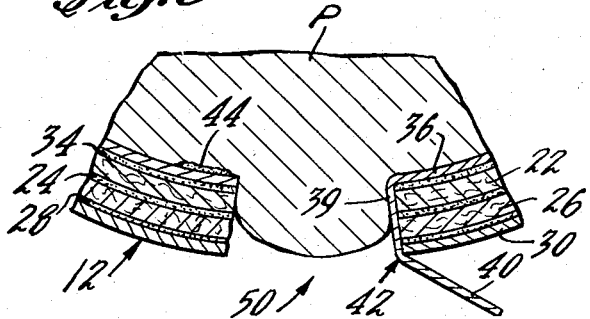
INVENTOR.
ARTHUR JOHN WHITE
BY John E. Wilson
AGENT

United States Patent Office 3,441,197
Patented Apr. 29, 1969

3,441,197
SIDE OPENING CONTAINER
Arthur John White, Woodbury, N.Y., assignor to American Can Company, New York, N.Y., a corporation of New Jersey
Filed Apr. 10, 1967, Ser. No. 629,453
Int. Cl. B65d 17/00, 5/54, 5/70
U.S. Cl. 229—51                                            6 Claims

ABSTRACT OF THE DISCLOSURE

A container is provided with a side wall openable along a line of separation. A liner ply inside of the side wall has its marginal edge portions joined together in a lap joint which underlies the line of separation so that when the side wall is opened along the line, the liner ply separates along the lap joint and no additional opening steps are necessary.

Background of the invention

This invention relates to a spirally wound fibre container and more particularly, to such a container which may be adapted for packaging unbaked biscuit dough, cakes or similar products and opened at its side without the use of any opening tool or instrument.

In the past, there has been difficulty in providing a spirally wound biscuit dough container which can be easily opened and at the same time have sufficient strength to withstand the pressures developed internally by the leavening of the baking powder in the dough. The problem has been essentially one of compromise; the strength necessary to withstand the internal pressure has been balanced against the ease with which the container can be opened, a feature which heretofore inherently necessitated a reduction in strength.

Another factor which must be considered in such containers is the necessity of imperviousness to fluid and air. The moisture of the dough or other product must be retained and air tightness is necessary to prevent spoilage. The necessities of air- and fluid-tightness have created a challenge to design a spirally wound biscuit dough container having these characteristics which can be easily opened without the use of an opening tool, because imperviousness, like strength, inherently requires a container which is somewhat difficult to open.

The construction of the presently available biscuit dough containers requires as a first step of the opening operation that an outer ply or plies be manually ripped off or torn through by means of a string or tape to initiate the rupture of the body structure, and, as a second step, that the container be sharply rapped against a table edge to break through an inner liner ply to complete the rupture of the body. Such a multi-step procedure is bothersome and often difficult for a consumer, especially a housewife.

The present invention on the other hand has as one of its objectives the provision of a fibre spirally wound biscuit dough container having a body construction which can be completely ruptured by only a single step opening operation, and which at the same time is both strong and durable.

It is another object to provide a spirally wound fibre biscuit dough container which can be easily opened with a minimum of effort and which can be made of conventional and readily available materials on conventional manufacturing equipment.

Other objects will become apparent when the following description is read in the light of the annexed claims and accompanying drawings.

Brief description of the drawing

FIG. 1 is a front perspective view of a container made in accordance with the present invention;
FIG. 2 is a fragmentary view showing part of the container shown in FIG. 1, in perspective, but after the container has been partially opened;
FIG. 3 is a sectional view taken substantially along the line 3—3 of FIG. 2;
FIG. 4 is a sectional view similar to FIG. 3, but showing the relationship of the parts at one stage while the container is being opened;
FIG. 5 is a sectional view similar to FIG. 3, but showing the relationship of the parts after the body wall of the container has been completely ruptured; and
FIG. 6 is a sectional view similar to FIG. 3, but illustrating a second embodiment of the present invention.

Summary of the invention

To attain the above objects, spirally wound fibre containers are provided with a side wall having a line of separation, and a liner ply the marginal side portions of which are joined together in a lap joint which underlies the line of separation. The liner ply lap joint is air- and fluid-tight, but is constructed to open spontaneously under the internal pressure exerted by the container contents when the body wall of the container is breached or removed outwardly of the line of separation.

Description of the preferred embodiments

Taking the drawings in greater detail, there is shown in FIG. 1, a spirally wound container 10, generally similar to the ones disclosed in U. S. Patents 3,021,047 and 3,021,048 and having a body 12, a top end member 14 and a bottom end member 15 which may be secured to the side wall in conventional clinched seams as are the corresponding parts in said patents and a pull string 16, which is pulled by the consumer to open the container. The term "pull string" as used herein includes any elongated member such as a cord, wire or tape. The pull string 16 is shown in full lines at locations where it is disposed exteriorly of the container and visible to the user and in dotted lines at locations where it is invisible to the user. The dotted line segment, which rises toward the left in FIG. 1 illustrates a portion of the string which lies just below the label ply whereas the dotted line segment which is shown in FIG. 1 as spiraling downwardly represents a portion of the string which lies between the edges of a body ply as will be described in detail hereinafter.

The arrangement of parts in the helically wound body 12 in the area of the pull string which makes possible a strong impervious and yet easily opened container is illustrated in cross-section in FIG. 3. The body 12 includes an inner body ply 22, an outer body ply 26, a label ply 30, and a liner ply 36. The inner body ply 22 is adhered by an adhesive layer 24 to the outer body ply 26 and the outer body ply 26 has adhered to it, through an adhesive bond 28, the label ply 30. The inner body ply 22 is covered on its inner side 32 with an adhesive coat 34 which adheres the liner ply 36 to the body ply 22. The liner ply 36 has a marginal hemmed portion 38 which is folded outwardly along a line of fold, indicated by the numeral 42, so as to have an inner hem layer 39 and an outer hem layer 40.

The liner ply 36 may be made of a homogenous layer of a moisture impervious material such as a polyethylene or other plastic film, aluminum foil, or other metallic foil, or "greaseproof" paper. Alternatively, it may be made of two or more laminate layers so that the innermost layer, that is, the layer contiguous to the product P, is a moisture impervious material such as a plastic film or a metallic foil, and the outer layer is a less expensive but pervious material such as kraft paper. If the liner ply 36 is constructed of two such layers, the end edges of the water pervious layer will not contact the product P because the hem has the effect of shielding these edges of both layers from the product. Preventing contact of the edges of the moisture pervious layer with the product prevents wicking of moisture into the liner ply and consequent failure of the container due to seepage of the moisture.

The marginal hemmed portion 38 of the liner ply 36 underlies the pull string 16 and underlies and is joined to the opposing marginal portion 45 of the liner ply 36 by an adhesive 44 to make a sealed lap joint J, which serves to prevent wrinkling of the hemmed portion 38 and to prevent penetration of moisture between the portions 38, 45 and into the body plies 22, 26. The adhesive 44 is desirably one of low peel resistance. The first body ply 22 is discontinuous, that is, its side edges 46 and 48 do not contact one another. The edges 46 and 48 are not spaced far enough apart to unnecessarily weaken the container 10, but far enough to allow the pull string 16 to be positioned between them. Because the container 10 is spirally wound the edges 46 and 48 are spiral in form and define a line of separation between them so that the portion of the pull string 16 which is retained between the edges 46 and 48 is of a spiral configuration as can be seen from FIG. 1.

The embodiment of FIG. 6 differs from the one shown in FIGS. 3 and 4 in that the marginal portion 38 of the liner ply 36 is not hemmed. However, just as in the embodiment of FIGS. 3 and 4, the marginal side portion 38 is joined to the side portion 45 by an adhesive bond 44. In the embodiment of FIG. 6, however, the adhesive bond 44 is desirably low in shear resistance. The differences in operation between the two embodiments is explained hereinafter.

As pointed out supra, the product P is one which is under internal pressure, either because it generates such pressure after packaging, as when it is pre-mixed baking dough, or because it is packed under pressure. The internal pressure aids in the opening of the container and in effect makes the container self-opening when the pull string is pulled, as will be explained infra. Prior to the opening of the container, the internal pressure is counteracted by tension in the side wall particularly in the body ply 26.

In the opening operation of the embodiment of FIG. 3, the user grasps the portion of the pull string 16 which is visible and pulls outwardly and upwardly to the left. The pull string 16 progressively rips through the label ply 30 until the only part of the pull string which has not been pulled through the label ply 30 is that portion which is disposed under the outer body ply 26 and between the side edges 46 and 48 of the body ply 22. Thereafter, the string is pulled downwardly to progressively rupture the second body ply 26 and the label ply 30, as seen in FIGS. 2 and 4 along a line of separation which is outwardly aligned with the line of separation formed by the spiral channel between the edges 46, 48 of the body ply 22, thus leaving the liner ply 36 as the only unruptured element of the body 12. The pressure of the biscuit dough or other product P which is exerted on the weakened body now causes the inner layer 40 of the liner hem 38 to peel away from the adhesive 44 which has hitherto bonded it to the marginal edge portion 45. This results in an unfolding of the hem 38 (see FIG. 3) which continues until the lap joint J is entirely opened up. Concurrently therewith, the edges 46, 48 of the body ply 22, and the severed edges of the body ply 26 and label ply 30 move apart, thus creating a spiral gap 50. After the lap joint J has been fully opened, the product P under internal pressure pushes the marginal portion 38 of the liner ply 36 through the gap 50 (see FIG. 5) as it pushes apart the portions of the side wall on either side of the line separation.

The result is that the container body 12 has a spiral opening 50 formed in it which extends over most of its length. Thereafter, if the opposite ends of the container are grasped in the hands of the consumer and twisted in opposite directions, the side wall assumes a generally flat configuration and the product P is then made completely accessible to the consumer. Complete accessibility is necessary if a product such as a stack of biscuit dough cakes is to be removed without mutilation.

In the opening of the embodiment shown in FIG. 6, as in the previously described embodiment, the string is pulled to rupture the body ply 26 and label ply 30, and the product P, which is under pressure, causes the body plies to separate at the line of tear which is thus formed in the portion of the body ply 26 which bridges the channel in the body ply 22 between the edges 46 and 48. The liner ply marginal portion 38 moves to the right with respect to the marginal portion 45 of the liner ply 36 under the internal pressure of the product causing the adhesive 44 between those marginal portions to rupture in shear. Thereafter, just as in the previously described embodiment, the product pushes the marginal portions 38 through the spiral opening which extends over most of the length of the container, and the user is enabled to gain easy access to the product P merely by twisting the ends of the container.

Both of the embodiments described above show a container having two body plies, but a container with only one body ply is within the purview of the present invention. In one such construction, the body ply 22 would be omitted and the pull string 16 would be positioned inside of the single body ply 26 in contact with the label hem 40, so that when the string is pulled and the body ply is severed to form a line of separation, the liner ply seam opens spontaneously in the manner described. Alternatively, the body ply 26 could be omitted. In such construction, the pull string is positioned between the edges 46, 48 of the body ply and the label ply 30 is made of sufficient strength to function as a tension member to withstand the product pressure until the string is pulled. Thereafter, the liner ply seam would in like manner open spontaneously.

Also within the scope of the present invention is a container which is opened by means other than a pull-string. For example, the container body can be modified by omitting the pull string 16 and by making the body ply 26 capable of being ripped or peeled off to expose the spiral line of separation between the edges of the body ply 22 and thus permit the product to rupture the adhesive joint between the overlapped edges of the label ply 36 in the manner heretofore described. In all such modified constructions, the body outwardly of the liner lap seam is ruptured or breached by the consumer, and the pressure of the product relied upon to cause spontaneous rupture of the underlying liner ply seam.

It will be understood that in both the construction of FIG. 3 and of FIG. 6, under some circumstances the main body ply 26 may expand slightly during storage, prior to its being opened, as the pressure in the container builds up due to the leavening action of the baking powder. In both cases the liner ply marginal portions 38 will move slightly to the right relative to its portion 45 without breaking open the adhesive joint therebetween. In the construction of FIG. 3, the hemmed portion 38 will partially unpeel, while in the construction of FIG. 6, the adhesive 44 should be elastic enough to stretch to some extent before it ruptures in shear. The result in both cases is that the liner ply lap joint serves as an expansion joint and the liner ply is spared the excessive strain which might otherwise cause it to tear.

It is understood that modifications, substitutions, additions, and omissions of both elements and material could be made in the present invention by one skilled in the art without exceeding its scope.

I claim:

1. A spirally wound container comprising an inner body ply having spirally disposed edges being spaced apart to define between them a spiral channel, a pull string partially disposed in said channel, a liner ply, said liner ply having one marginal side portion adhered to the inner surface of said inner body ply and lying on one side of said channel and a second margial side portion bridging said channel and joined to said one marginal side portion in a lap joint by a disruptable adhesive bond.

2. The spirally wound container defined in claim 1 wherein said second marginal side portion is hemmed outwardly so as to include an inner hem layer and an outer hem layer and wherein said disruptable adhesive bond is disposed between said outer hem layer and said one marginal side portion.

3. The spirally wound container defined in claim 2 wherein said body ply is covered outwardly with an outer body ply.

4. A spirally wound container comprising an inner body ply having a channel extending longitudinally of said container at the inner surface thereof, a pull string partially disposed in said channel, a liner ply, said liner ply having one marginal side portion adhered to the inner surface of said inner body ply at one side of said channel and a second marginal side portion bridging said channel and joined to said one marginal side portion in a lap joint by a disruptable adhesive bond.

5. A spirally wound container defined in claim 4 wherein said second marginal side portion is hemmed outwardly so as to include an inner hem layer and an outer hem layer and wherein said disruptable adhesive bond is disposed between said outer hem layer and said one marginal side portion.

6. The spirally wound container defined in claim 5 wherein said body ply is covered outwardly with an outer body ply.

References Cited

UNITED STATES PATENTS

| | | |
|---|---|---|
| 1,936,417 | 11/1933 | Ware. |
| 2,681,284 | 6/1954 | Graves. |
| 3,021,047 | 2/1962 | Pottle et al. |
| 3,021,048 | 2/1962 | Pottle et al. |
| 3,042,286 | 7/1962 | Pottle. |
| 3,079,059 | 2/1963 | Kuchenbecker ____ 229—48 XR |
| 3,153,506 | 10/1964 | Pottle. |
| 3,185,577 | 5/1965 | Krause. |
| 3,221,975 | 12/1965 | Zoeller et al. |
| 3,241,739 | 3/1966 | Ahlemeyer. |

DAVIS T. MOORHEAD, *Primary Examiner.*